(12) United States Patent
Akerson

(10) Patent No.: US 6,344,985 B1
(45) Date of Patent: Feb. 5, 2002

(54) MULTIPLE PORT BI-DIRECTIONAL POWER CONVERTER

(75) Inventor: Steve Heart Akerson, Paquera (CR)

(73) Assignee: Heart Transverter S.A., Punta Renas (CR)

( * ) Notice: Subject to any disclaimer, the term of this patent is extended or adjusted under 35 U.S.C. 154(b) by 0 days.

(21) Appl. No.: 09/729,315

(22) Filed: Dec. 5, 2000

(51) Int. Cl.⁷ .................................................. H02M 7/00
(52) U.S. Cl. ........................................................ 363/65
(58) Field of Search .............................. 363/59, 60, 61, 363/65, 67, 71

(56) References Cited

U.S. PATENT DOCUMENTS

| 4,564,896 | A | | 1/1986 | Akerson | |
|---|---|---|---|---|---|
| 4,742,441 | A | | 5/1988 | Akerson | |
| 5,047,910 | A | | 9/1991 | Levran et al. | |
| 5,155,672 | A | | 10/1992 | Brown | |
| 5,319,536 | A | * | 6/1994 | Malik | 363/65 |
| 5,659,465 | A | * | 8/1997 | Flack et al. | 363/71 |
| 5,757,633 | A | | 5/1998 | Bowles | |
| 5,768,116 | A | | 6/1998 | Kompelien | |
| 5,862,047 | A | * | 1/1999 | Elsener et al. | 363/65 |
| 6,021,052 | A | | 2/2000 | Unger et al. | |
| 6,067,243 | A | | 5/2000 | Suzuki et al. | |
| 6,069,804 | A | | 5/2000 | Ingman et al. | |
| 6,084,790 | A | * | 7/2000 | Wong | 363/71 |

* cited by examiner

Primary Examiner—Matthew Nguyen
(74) Attorney, Agent, or Firm—Baker Botts L.L.P.

(57) ABSTRACT

In one embodiment of the present invention, a bi-directional power converter is described. The converter comprises a first bi-directional DC-DC conversion device having a first plurality of bi-directional DC-DC converters, a plurality of power supply ports, each connected to at least one of the first plurality of bi-directional DC-DC converters, and a voltage medium capacitor, which is connected to each of the first plurality of bi-directional DC-DC converters and has a first voltage greater than a second voltage measured at each of the power supply ports. The converter further may comprise a third bi-directional DC-DC converter device, which is connected to the voltage medium capacitor and is connected to a voltage high capacitor. The converter also may comprise a bi-directional AC-DC conversion device, which bi-directional AC-DC conversion device is connected to the voltage high capacitor and at least one inductor, which is connected to a plurality of AC ports. In another embodiment of the present invention, at least one of the DC ports may be a hydrogen fuel cell.

110 Claims, 8 Drawing Sheets

MULTIPLE PORT BI-DIRECTIONAL POWER CONVERTER

BACKGROUND OF THE INVENTION

1. Field of the Invention

The invention relates generally to the field of bi-directional power conversion devices. More specifically, the invention is directed towards a bi-directional DC-AC or DC-DC power conversion device.

2. Description of Related Art

Known commercial vehicles, such as a recreational vehicle or a boat, may have multiple DC ports. The DC ports may be battery terminals, and each battery may have different characteristics and charging needs. In particular, such batteries may be maintained at different voltages. Further, power may be transferred between batteries having different voltages and between the batteries and an AC port, such as an AC generator. Devices exist for transferring power between a plurality of DC ports of the same or different voltages and between DC and AC ports. However, such known devices are often inefficient. In these known devices, current flowing through each DC port may not be entirely or even substantially DC, which decreases power transfer efficiency.

For example, a known conversion device may convert directly between a first DC port voltage and a second voltage, where the second voltage may be at least four times the first DC port voltage, and may between thirteen and sixteen times the first voltage. A direct conversion between the first DC port voltage and the second voltage may decrease efficiency of power transfer. Further, a known conversion device may comprise a transformer. In such a device, a turns ratio between a secondary side of the transformer and a primary side of the transformer may be equal to a ratio between the second voltage and the first DC port voltage. Therefore, a direct conversion between the first DC port voltage and the second voltage also may increase transformer leakage inductance by providing a turns ratio between the secondary side and the primary side of greater than four.

Further, it has become increasingly useful to utilize hydrogen fuel cells as DC ports. However, hydrogen fuel cells often may change their voltages inefficiently in response to a change in a voltage measured at a load. Moreover, the known devices for transferring power between a plurality of DC ports of the same or different voltages and between DC and AC ports may not efficiently compensate for the hydrogen fuel cell's often inefficient response to changes in the voltage measured at the load.

SUMMARY OF THE INVENTION

Therefore a need has arisen for an apparatus that overcomes these and other shortcomings of the related art. An object of the present invention is that a bi-directional power converter for transferring power between a plurality of power supply ports is provided. Another technical advantage of the present invention is that the bi-directional power converter may transfer power in either direction between any combination of the power supply ports and a plurality of AC ports. Still another technical advantage of the present invention is that the bi-directional power converter may transfer power in either direction when the plurality of power supply ports each have different voltages. Still yet another technical advantage of the present invention is that the bi-directional power converter may provide a substantially or entirely DC current flowing through the power supply ports.

According to an embodiment of the present invention, a bi-directional power converter is described. The converter comprises a first bi-directional DC-DC conversion device having a first plurality of bi-directional DC-DC converters. It further may comprise a plurality of power supply ports, each connected to at least one of the first plurality of bi-directional DC-DC converters and a voltage medium capacitor. The power supply ports transfer power to each other. The voltage medium capacitor is connected to each of the first plurality of bi-directional DC-DC converters and has a first capacitor voltage greater than a second voltage measured at each of the power supply ports.

In another embodiment of the present invention, a bi-directional power converter is described. The converter comprises a first bi-directional DC-DC conversion device having a first plurality of bi-directional DC-DC converters. It further may comprise a plurality of power supply ports, each connected to at least one of the first plurality of bi-directional DC-DC converters, which power supply ports transfer power to each other, and a voltage medium capacitor, which is connected to each of the first plurality of bi-directional DC-DC converters and has a first capacitor voltage greater than a second voltage measured at each of the power supply ports. In addition, the converter comprises at least one second bi-directional DC-DC conversion device having a second plurality of bi-directional DC-DC converters. Moreover, the first bi-directional DC-DC conversion device and each of the second bi-directional DC-DC conversion devices are connected in parallel. Further, the converter comprises a third bi-directional DC-DC converter device, which is connected to the voltage medium capacitor and a voltage high capacitor, and a bi-directional AC-DC conversion device, which is connected to the voltage high capacitor and at least one inductor, which is connected to a plurality of AC ports.

Other objects, features, and advantages will be apparent to persons of ordinary skill in the art in view of the following detailed description of the invention and the accompanying drawings.

BRIEF DESCRIPTION OF THE DRAWINGS

For a more complete understanding of the present invention, needs satisfied thereby, and features and advantages thereof, reference now is made to the following descriptions taken in connection with the accompanying drawings in which.

DETAILED DESCRIPTION OF PREFERRED EMBODIMENTS

Figure 1:
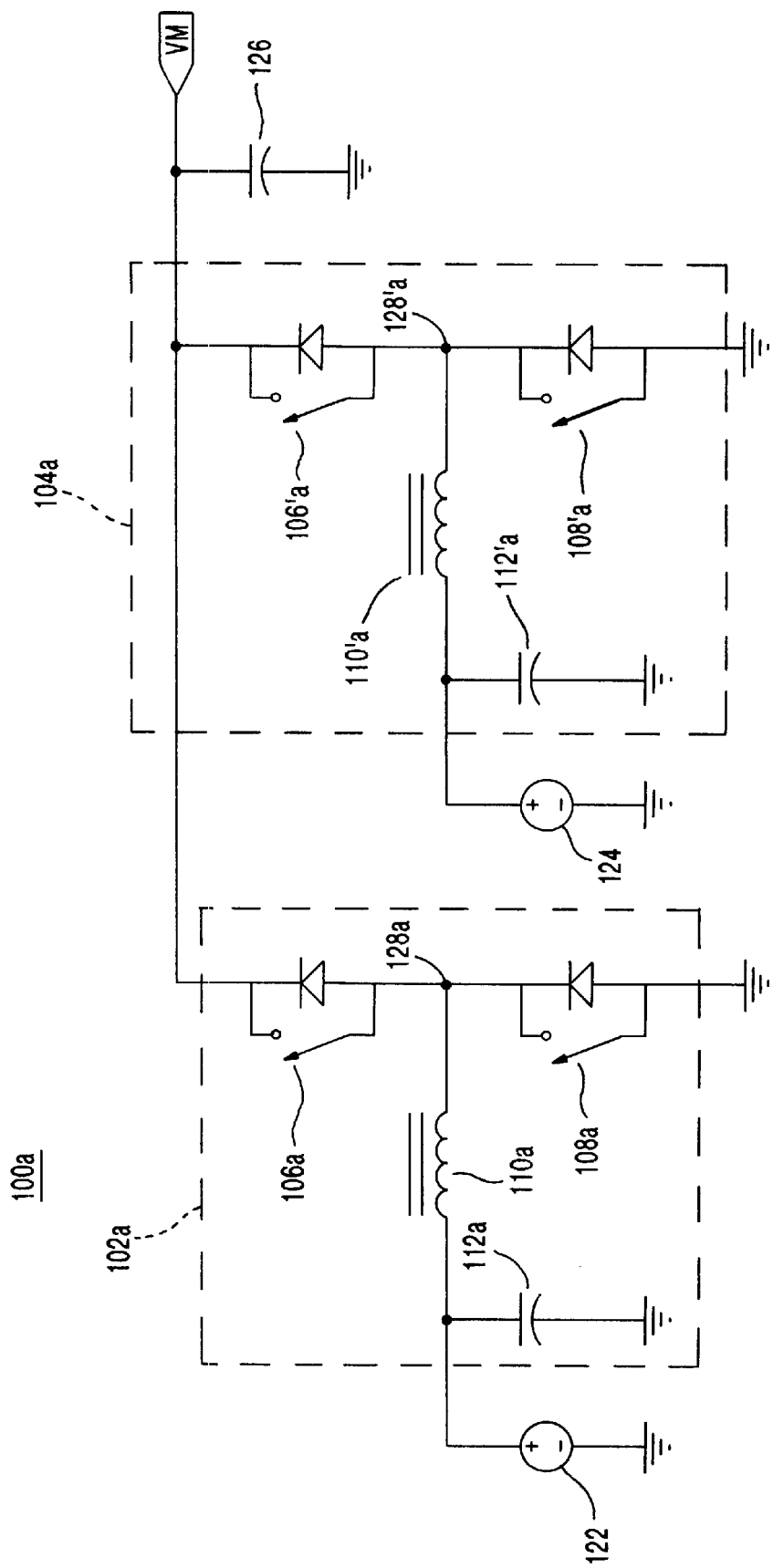
FIG. 1 is a schematic of a bi-directional DC-DC conversion device having two bi-directional DC-DC converters connected to each other via a voltage medium capacitor, according to an embodiment of the present invention.

Preferred embodiments of the present invention and their features and advantages may be understood by referring to FIGS. 1–8, in which like numerals are used for like corresponding parts in the various figures.

The present invention allows bi-directional power converters to transfer power in either direction between a plurality of power supply ports, which, in one embodiment, may be a plurality of DC ports. Alternatively, the present invention may allow power transfer, in either direction, between a combination of the plurality of DC ports and a plurality of AC ports. With this invention, a plurality of power supply ports are provided, which may be DC ports. Each DC port may be connected to a bi-directional DC-DC converter. This arrangement of a plurality of DC ports connected to a plurality of DC-DC converters may be a DC-DC conversion device, in which each bi-directional DC-DC converter of the bi-directional conversion device may convert between a voltage medium and a voltage measured at its connected DC port. The voltage medium may be measured at the voltage medium capacitor. The voltage medium may be greater than the voltage measured at each of the DC ports. For example, the voltage medium may be about 50 volts. Further, each of the DC ports may be pulse width modulated to maintain the voltage measured at the voltage medium capacitor at a substantially constant value. In this preferred embodiment power transfers between DC ports having different voltages regardless of the voltage measured at the individual DC ports. In addition, a plurality of the bi-directional DC-DC converter devices may be connected in parallel with each other, and each DC-DC converter of each DC-DC conversion device further may be connected to at least one of DC port. The plurality of bi-directional DC-DC conversion devices may generate a current flowing through each DC port that is substantially or entirely a DC current.

In addition, the voltage medium capacitor may be connected to another bi-directional DC-DC conversion device, which may be a high frequency inverter circuit. For example, the inverter circuit may operate at about 70 KHz. Further, this bi-directional DC-DC conversion device may include a transformer having a primary side and a secondary side. The secondary side may have a voltage high, which may be measured at a voltage high capacitor. The voltage high may be defined as a voltage of at least four times the voltage measured at each DC port, and no more than four times the voltage measured at the voltage medium capacitor. The voltage high may be about 190 volts. Further, a transformer may isolate the voltage medium capacitor from the voltage high capacitor, and may convert between the voltage measured at the voltage medium capacitor and the voltage measured at the voltage high capacitor. Moreover, because conversion is between the voltage measured at the voltage medium capacitor and the voltage measured at the voltage high capacitor, the voltage step-down or step-up performed by this bi-directional DC-DC conversion device may be much less than a direct conversion between the voltage measured at the voltage high capacitor and the voltage measured at one of the DC ports. In addition, a turns ratio between a secondary side and a primary side of the transformer may be the same as a ratio between the conversion voltages. Therefore, the turns ratio between the secondary side and the primary, side may be substantially less for the conversion between the voltage measured at the voltage high capacitor and the voltage measured at the voltage medium capacitor, than would be the turns ratio for the conversion between the voltage measured at the voltage high capacitor and the voltage measured at one of the DC ports. In particular, the turns ratio may be less than four, which may decrease transformer leakage inductance.

Moreover, the voltage high capacitor may be connected to a bi-directional AC-DC conversion device. The bi-directional AC-DC conversion device may be connected to a plurality of AC ports. Further, the plurality of AC ports may be connected to output switches, which further may be connected to at least one inductor. Thus, the present invention may allow power transfer in either direction between a plurality of DC ports, or, alternatively, between a combination of the plurality of DC ports and a plurality of AC ports.

Referring to FIG. 1, a schematic of a first bi-directional DC-DC conversion device 100a according to an embodiment of the present invention is described. In this embodiment, first bi-directional DC-DC conversion device 100a may include first bi-directional DC-DC converter 102a and second bi-directional DC-DC converter 104a. First bi-directional DC-DC converter 102a may include a primary first switching device 106a, a primary second switching device 108a, a primary first inductor 110a, and a primary first capacitor 112a. Primary first switching device 106a and primary second switching device 108a may each comprise a plurality of switches. Primary first switching device 106a and primary second switching device 108a may each be a metal-oxide-semiconductor field-effect transistor ("MOSFET") with an internal diode, or alternatively, may be an internal gate biased transistor ("IGBT"). In this embodiment, primary first inductor 110a, which may be an input or output inductor, may be connected in parallel with primary first capacitor 112a, and in series with a source side of primary first switching device 106a and a drain side of primary second switching device 108a. Further, primary first switching device 106a and primary second switching device 108a may be connected in parallel via the source side of primary first switching device 106a and the drain side of primary second switching device 108a, thereby forming a primary first junction 128a.

In addition, first bi-directional DC-DC converter 102a may be connected to a power supply port 122 via primary first capacitor 112a and primary first inductor 110a. Power supply port 122 may be a DC port, and the DC port may be a battery. Moreover, the battery may be a rechargeable battery. Alternatively, the DC port may be a photovoltaic array. The photovoltaic array may be pulse width modulated to maintain a voltage measured at the photovoltaic array at a maximum power point for the array. In a modification of the above-described embodiment, the DC port may be a hydrogen fuel cell, a DC load, a DC hydro generator, or a DC wind generator. Moreover, a voltage measured at the DC port may vary in response to a change in a voltage measured at a load. However, with respect to the hydrogen fuel cell, such response may be inefficient. In this embodiment, first bi-directional DC-DC conversion device 100a also may include a bank of rechargeable batteries. Such rechargeable batteries may be one of the other DC ports. Moreover, the rechargeable batteries may serve as an energy buffer between the hydrogen fuel cell and the load, and also may supplement the hydrogen fuel cell during the changing of the voltage measured at the load. Further, first bi-directional DC-DC converter 102a also may be connected to a voltage medium capacitor 126 via a drain side of primary first switching device 106a.

Similarly, a second bi-directional DC-DC converter 104a may include a secondary first switching device 106'a, a secondary second switching device 108'a, a secondary first inductor 110'a, and a secondary first capacitor 112'a. Secondary first switching device 106'a and secondary second switching device 108'a may each comprise a plurality of switches. Secondary first switching device 106'a and secondary second switching device 108'a may each be a MOSFET with an internal diode, or alternatively, may be an IGBT. In this embodiment, secondary first inductor 110'a, which may be an input or output inductor, may be connected in parallel with secondary first capacitor 112'a, and in series with a source side of secondary first switching device 106'a and a drain side of secondary second switching device 108'a. Further, secondary first switching device 106'a and secondary second switching device 108'a may be connected in parallel via the source side of secondary first switching device 106'a and the drain side of secondary second switching device 108'a, thereby forming a secondary first junction 128'a.

In addition, second bi-directional DC-DC converter 104a may be connected to a power supply port 124 via secondary first capacitor 112'a and secondary first inductor 110'a. Power supply port 124 may be a DC port, and the DC port may be a battery. Moreover, the battery may be a rechargeable battery. Alternatively, the DC port may be a photovoltaic array. The photovoltaic array may be pulse width modulated to maintain a voltage measured at the photovoltaic array at a maximum power point for the array. In a modification of the above-described embodiment, the DC port may be a hydrogen fuel cell, a DC load, a DC hydro generator, or a DC wind generator. Moreover, a voltage measured at the DC port may vary in response to a change in a voltage measured at a load. However, with respect to the hydrogen fuel cell, such response may be inefficient. In this embodiment, first bi-directional DC-DC conversion device 100a also may include a bank of rechargeable batteries. The rechargeable batteries may form one of the other DC ports. The rechargeable batteries may serve as an energy buffer between the hydrogen fuel cell and the load, and also may supplement the hydrogen fuel cell during the changing of the voltage measured at the load. Further, second bi-directional DC-DC converter 104a also may be connected to voltage medium capacitor 126 via a drain side of secondary first switching device 106'a.

Figure 5:
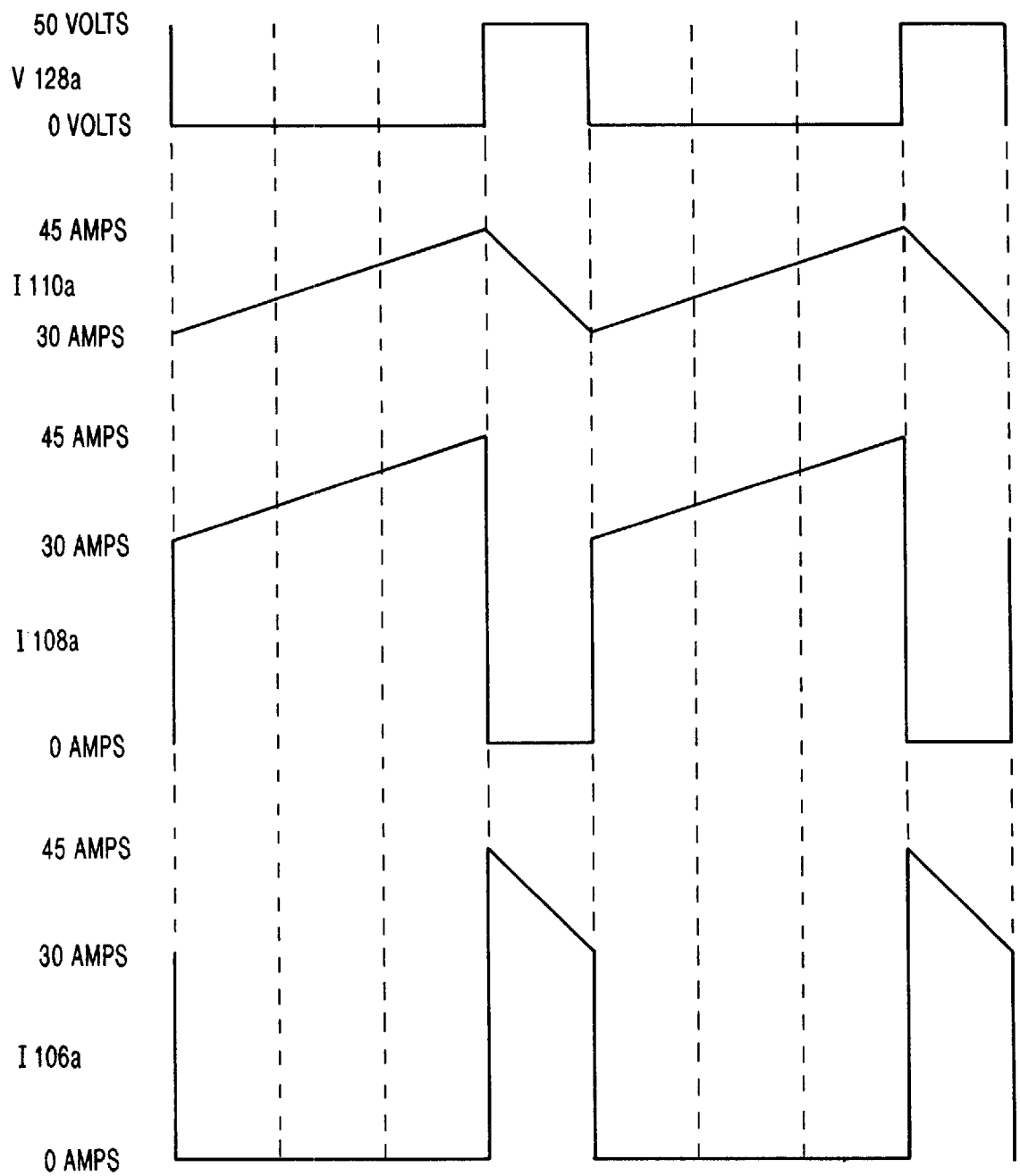
FIG. 5 is a diagram of waveforms for the bi-directional DC-DC conversion device of FIG. 1, according to a further embodiment of the present invention.

Referring to FIG. 5, in this embodiment, primary first switching device 106a and primary second switching device 108a may compliment each other. When primary first switching device 106a is open, primary second switching device 108a may be closed, or alternatively, when primary first switching device 106a is closed, primary second switching device 108a may be open. The opening and closing of primary first switching device 106a may result in primary first switching device 106a having a duty cycle related to a time ratio, where the time ratio may be an amount of time that primary first switching device 106a is closed divided by an amount of time that first bi-directional DC-DC converter 102a is in operation. When primary first switching device 106a is closed, a current may flow from voltage medium capacitor 126 to power supply port 122, which current may not be an entirely or substantially DC current. The voltage measured at voltage medium capacitor 126 may be equal to the voltage measured at power supply port 122 divided by the time ratio. Thus, the duty cycle of primary first switching device 106a may determine a relative difference between the voltage measured at voltage medium capacitor 126 and power supply port 122. Further, if the voltage measured at power supply port 122 changes, the duty cycle of primary first switching device 106a also may change, such that the voltage measured at voltage medium capacitor 126 may remain substantially constant. This substantially constant voltage may be greater than the voltage measured at power supply port 122, and the substantially constant voltage may be about 50 volts. In a modification of the above described embodiment, this substantially constant voltage may be between about 1.01 and about 5 times the voltage measured at power supply port 122, and the substantially constant voltage may be between 50 and 70 volts. Further, DC-DC conversion may be between the voltage measured at voltage medium capacitor 126 and the voltage measured at power supply port 122.

Similarly, with regard to second bi-directional DC-DC converter 104a, secondary first switching device 106'a and secondary second switching device 108'a may compliment each other. When secondary first switching device 106'a is open, secondary second switching device 108'a may be closed, or alternatively, when secondary first switching device 106'a is closed, secondary second switching device 108'a may be open. The opening and closing of secondary first switching device 106'a may result in secondary first switching device 106'a having a duty cycle determined by a time ratio, where the time ratio may be an amount of time that secondary first switching device 106'a is closed divided by an amount of time that second bi-directional DC-DC converter 104a is operating. When secondary first switching device 106'a is closed, a current may flow from voltage medium capacitor 126 to power supply port 124. The voltage measured at voltage medium capacitor 126 may be equal to the voltage measured at power supply port 124 divided by the time ratio. Thus, the duty cycle of secondary first switching device 106'a may determine a relative difference between the voltage measured at voltage medium capacitor 126 and power supply port 124. Further, if the voltage measured at power supply port 122 changes, the duty cycle of secondary first switching device 106'a also may change, such that the voltage measured at voltage medium capacitor 126 may remain substantially constant. This substantially constant voltage may be greater than the voltage measured at power supply port 124, and the substantially constant voltage may be about 50 volts. In a modification of the above described embodiment, this substantially constant voltage may be between about 1.01 and about 5 times the voltage measured at power supply port 124, and the substantially constant voltage may be between 50 and 70 volts. Further, DC-DC conversion may be between the voltage measured at voltage medium capacitor 126 and the voltage measured at power supply port 124. In addition, because first bi-directional converter 102a and second bi-directional converter 104a are connected to each other via primary first switching device 106a and secondary first switching device 106'a , power may be transferred between these power supply ports.

Moreover, if power supply port 122 and power supply port 124 have equal voltages, then the duty cycles of primary first switching device 106 and secondary first switching device 106'a may be the same. However, if power supply port 122 has a voltage that is not equal to a voltage measured at power supply port 124, then the duty cycles of primary first switching device 106a and secondary first switching device 106'*a* may be different. Further, because primary first switching device 106 and secondary first switching device 106' may have their own individual duty cycles, the duty cycles may be individually adjusted, such that the voltage measured at voltage medium capacitor 126 may remain substantially constant. Therefore, this embodiment may be used for power supply ports having different values. In addition, multiple power supply ports may be utilized and may be connected to bi-directional DC-DC converters.

Figure 2:
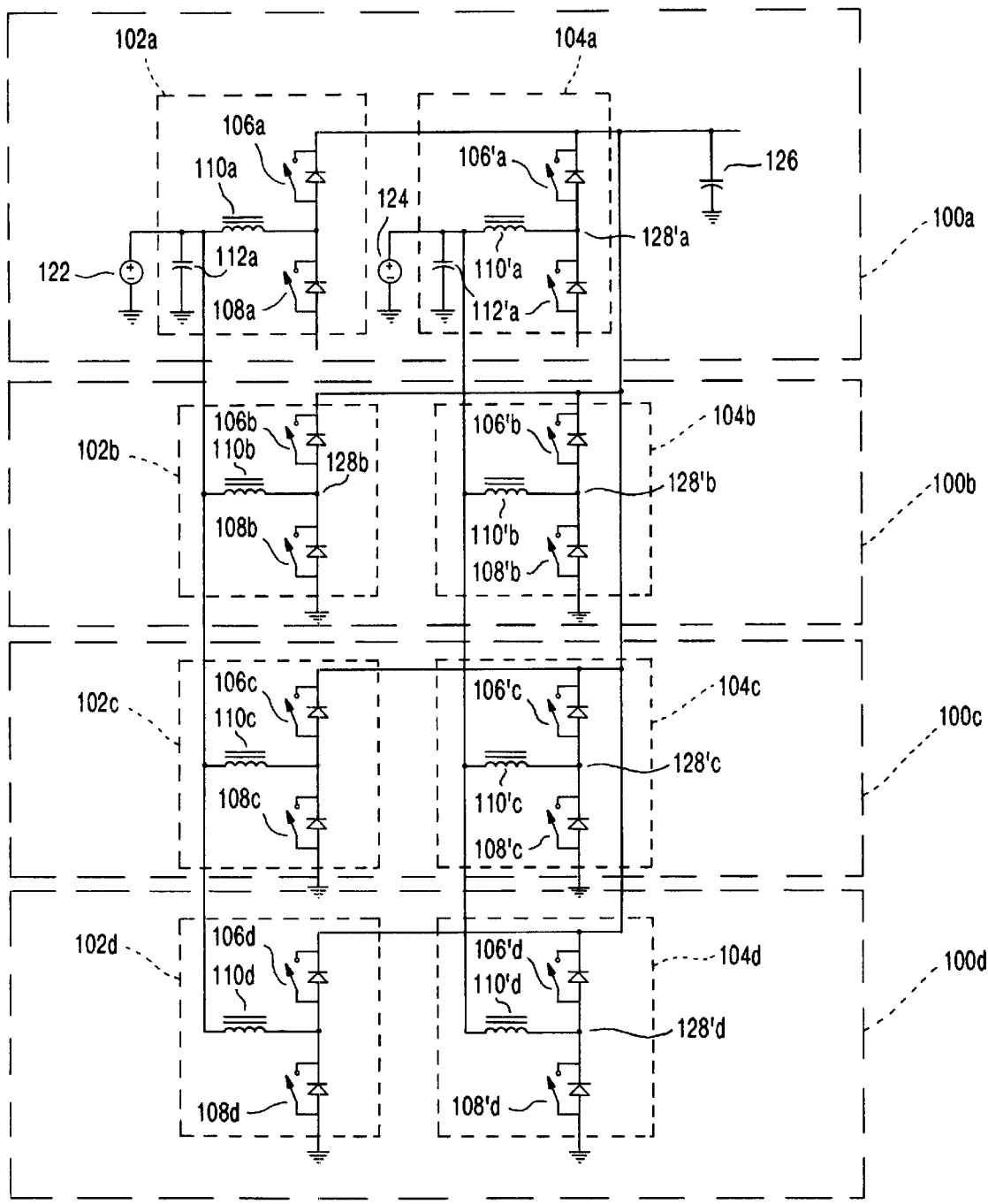
FIG. 2 is a schematic of a bi-directional DC-DC conversion device having four bi-directional DC-DC conversion devices of FIG. 1 arranged in parallel, according to another embodiment of the present invention.

Referring to FIG. 2, a schematic of a bi-directional DC-DC conversion device according to another embodiment of the present invention is described. In this embodiment, first bi-directional DC-DC conversion device 100*a* may be connected in parallel with at least one, second bi-directional DC-DC conversion device. Specifically, in this embodiment, first bi-directional DC-DC conversion device 100a may be connected in parallel with second bi-directional DC-DC conversion devices 100*b*, 100*c*, and 100*d*. Second bi-directional DC-DC conversion devices 100*b*–*d* may each include first parallel bi-directional DC-DC converters 102*b*–*d* and second parallel bi-directional DC-DC converters 104*b*–*d*. Each of first parallel bi-directional DC-DC converters 102*b*–*d* may include primary first parallel switching devices 106*b*–*d* and primary second parallel switching devices 108*b*–*d*. Further, each of second parallel bi-directional DC-DC converters 104*b*–*d* may include secondary first parallel switching devices 106'*b*–*d* and secondary second switching devices 108'*b*–*d*. Each of the second bi-directional conversion devices 100*b*–*d* operates substantially similarly to bi-directional conversion device 100*a*. Further, the elements that may comprise second bi-directional conversion devices 100*b*–*d* operate substantially similarly to those described with respect to bi-directional conversion device 100*a*. Therefore, the following discussion focuses on differences between the foregoing embodiments.

In this embodiment, primary first parallel switching devices 106*b*–*d* and secondary first switching devices 106'*b*–*d* may be connected to the drain side of primary first switching device 106*a* and secondary first switching device 106'*a* , respectively. In addition, primary first parallel switching devices 106*b*–*d* and secondary first switching devices 106'*b*–*d* also may be connected to power supply ports 122 and 124, respectively. As described above in reference to FIG. 1, primary first parallel switching devices 106*b*–*d* and secondary first switching devices 106'*b*–*d* may have individual duty cycles that may control the relative difference between the voltage measured at voltage medium capacitor 126 and power supply ports 122 and 124, respectively. Therefore, primary first parallel switching devices 106*b*–*d* and secondary first switching devices 106'*b*–*d* may have the same duty cycles as primary first switching device 106*a* and secondary first switching device 106'*a*, respectively, and also may determine the relative value between the voltage measured at voltage medium capacitor 126 and power supply ports 122 and 124, respectively. Similarly, primary second parallel switching devices 108*b*–*d* and secondary second switching devices 108'*b*–*d* may have the same duty cycles as primary second switching device 108a and secondary second switching device 108'*a*.

Moreover, primary first parallel switching devices 106*b*–*d* and secondary first switching devices 106'*b*–*d* may have duty cycles that are out of phase with the duty cycles of primary first switching device 106a and secondary first switching device 106'*a*, respectively. The degree of phase difference between the duty cycles of primary first parallel switching devices 106*b*–*d* and secondary first switching devices 106'*b*–*d*, and primary first switching device 106*a* and secondary first switching device 106'*a*, respectively, may depend upon the number of first bi-directional DC-DC conversion devices 100*a* and second bi-directional DC-DC conversion devices 100*b*–*d* connected in parallel. In particular, the phase difference between the duty cycle of primary first switching device 106*a* and primary first parallel switching device 106*b* may be equal to a quotient of 360 degrees divided by a number of first bi-directional DC-DC conversion devices 100*a* and second bi-directional DC-DC conversion devices 100*b*–*d* connected in parallel (e.g., four (4)). In this embodiment, this phase difference may be 90 degrees. Further, the phase difference between primary first switching device 106*a* and primary first parallel switching device 106*c* may be twice as great as the phase difference between primary first switching device 106*a* and primary first parallel switching device 106*b*. In this embodiment, this phase difference may be 180 degrees. In additional, the phase difference between primary first switching device 106*a* and primary first parallel switching device 106*c* may be three times as great as the phase difference between primary first switching device 106*a* and primary first parallel switching device 106*b*. In this embodiment, this phase difference may be 270 degrees. Similarly, secondary first parallel switching devices 106'*b*–*d* may have duty cycles that are out of phase with the duty cycle of secondary first switching device 106'*a* . Moreover, primary second parallel switching devices 108*b*–*d* and secondary second parallel switching devices 108'*b*–*d* may have duty cycles that are out of phase with the duty cycles of primary second switching device 108*a* and secondary second switching device 108 '*a*, respectively.

Figure 6:
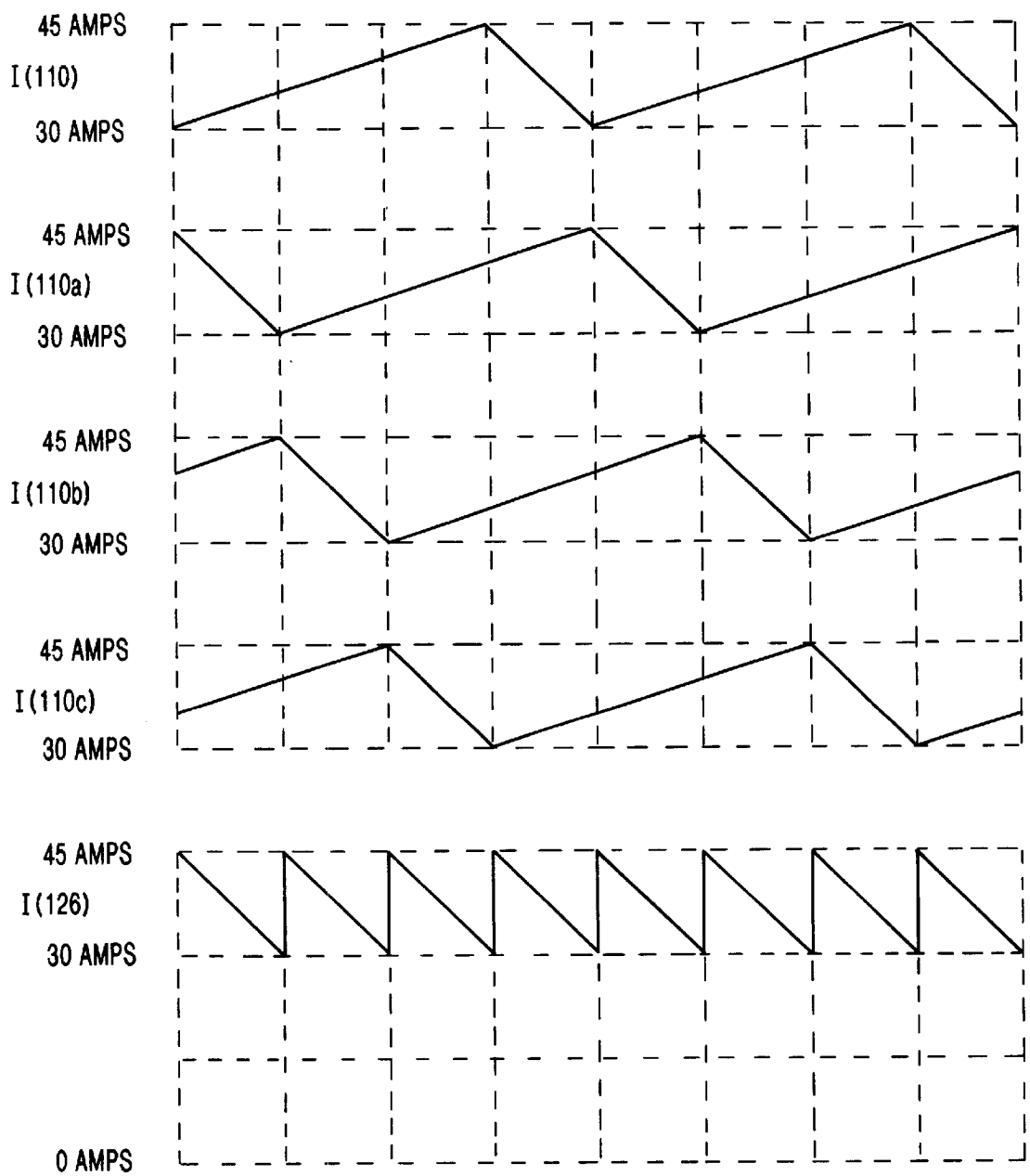
FIG. 6 is a diagram of waveforms for the bi-directional DC-DC conversion device of FIG. 2, according to yet a further embodiment of the present invention.

In this embodiment, first parallel bi-directional DC-DC converters 102*b*–*d* and second parallel bi-directional DC-DC converters 104*b*–*d* also may include primary first parallel inductors 110*b*–*d* and secondary first parallel inductors 110'*b*–*d*, respectively. Referring to FIG. 6, a current flowing through power supply port 122 may be a summation of a current flowing through primary first inductor 110*a* and primary first parallel inductors 110*b*–*d*. As shown in FIG. 6, a current flowing through primary first inductor 110*a* and each primary first parallel inductors 110*b*–*d* may be saw tooth shaped. Because there may be a phase difference in the duty cycles of primary first switching device 106a and primary first parallel switching devices 106*b*–*d*, the current flowing through primary first inductor 110*a* and primary first parallel inductors 110*b*–*d* also may be out of phase. Further, the current flowing through primary first inductor 110*a* and primary first parallel inductors 110*b*–*d* may be out of phase, such that when the currents flowing through these inductors is summed, a substantially or entirely DC current may flow through power supply port 122. Further, a current flowing into voltage medium capacitor 126 may always be greater than zero amps. Similarly, a substantially or entirely DC current may flow through power supply port 124.

Figure 3:
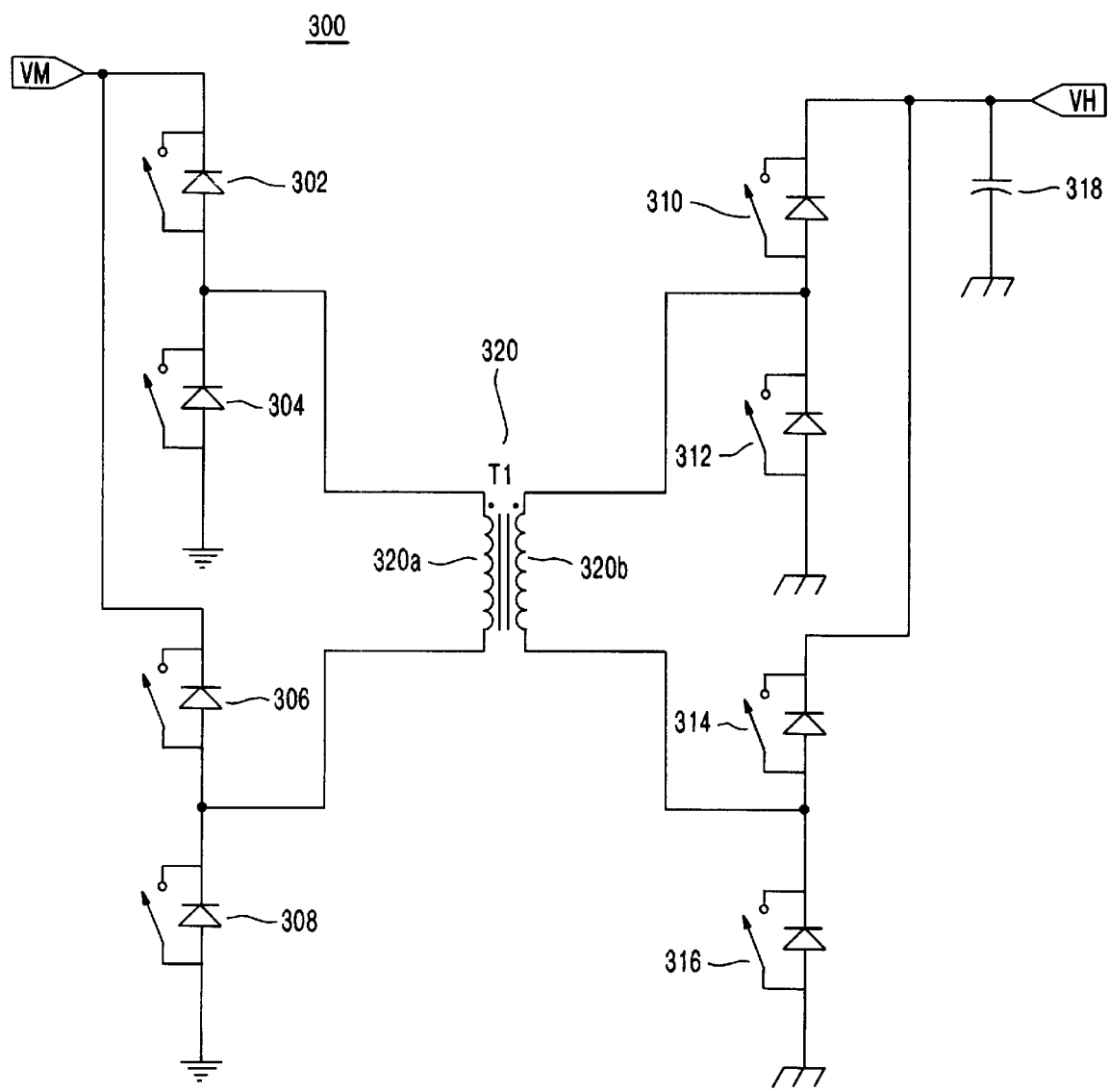
FIG. 3 is a schematic of a high frequency bi-directional DC-DC conversion device, according to yet another embodiment of the present invention.

Referring to FIG. 3, a schematic describes a high frequency bi-directional DC-DC conversion device according to yet another embodiment of the present invention. In this embodiment, a third bi-directional DC-DC conversion device 300 may be connected to first bi-directional DC-DC conversion device 100*a* of FIG. 1, or alternatively, to bi-directional device 100*a* connected in parallel with second bi-directional DC-DC conversion devices 100*b*–*d*, as shown in FIG. 2. Third bi-directional DC-DC conversion device 300 may be an inverter circuit, and may include a first plurality of switches and second plurality of switches. The switches may be MOSFETS, or alternatively, may be IGBT's. The first plurality of switches may include switches 302, 304, 306, and 308. A drain side of switches 302 and 306 may be connected to voltage medium capacitor 126, and a source side of switches 302 and 306 may be connected to a primary side 320a of a transformer 320. Further, a drain side of switches 304 and 308 may be connected to primary side 320a. The second plurality of switches may include switches 310, 312, 314, and 316. A drain side of switches 310 and 314 may be connected to a voltage high capacitor 318, and a source side of switches 310 and 314 may be connected to a secondary side 320b of transformer 320. Further, a drain side of switches 312 and 316 may be connected to secondary side 320b.

In this embodiment, primary side 320a and secondary side 320b may be coupled to each other and may provide isolation between voltage medium capacitor 126 and voltage high capacitor 318. In addition, the first plurality of switches may operate in two modes of operation. In a first mode of operation, switches 304 and 306 may be concurrently closed. When switches 304 and 306 are concurrently closed, switches 302 and 308 may remain concurrently open. In a second mode of operation, switches 304 and 306 may be concurrently open. When switches 304 and 306 are concurrently open, switches 302 and 308 may remain concurrently closed. The second plurality of switches may similarly operate in two modes of operation, and may be synchronized with the first plurality of switches. Thus, the first plurality of switches may form a bi-directional H-bridge between voltage medium capacitor 126 and primary side 320a. The second plurality of switches may similarly form a bi-directional H-bridge between voltage high capacitor 318 and primary side 320b. Moreover, the first and second plurality of switches may form a bi-directional H-bridge between primary side 320a and secondary side 320b. In this embodiment, a direction of a current flow between primary side 320a and secondary side 320b may depend upon whether the first and second plurality of switches are operating in the first or second modes of operation. Further, DC-DC conversion may occur between the voltage measured at voltage high capacitor 318 and the voltage measured at voltage medium capacitor 126.

In this embodiment, the voltage measured at voltage high capacitor 318 may be defined as at least four times the voltage measured at each DC port, and not more than four times the voltage measured at voltage medium capacitor 318. In a modification of the above-described embodiment, the voltage measured at voltage high capacitor 318 may be between about thirteen and about sixteen times the voltage measured at each DC port, and no more than four times the voltage measured at voltage medium capacitor 318. Further, the voltage measured at voltage high capacitor 318 may be maintained at a substantially constant voltage. In one embodiment, the voltage measured at voltage high capacitor 318 may be about 190 volts. In addition, a secondary side 320b and a primary side 320a may have a turns ratio. Secondary side 320b may have more turns than primary side 320a, and the turns ratio may be equal to a voltage ratio between the voltage measured at voltage high capacitor 318 and the voltage measured at voltage medium capacitor 126. Further, because the voltage measured at voltage medium capacitor 126 may be greater than the voltage measured at power supply ports 122 and 124, the turns ratio between secondary side 320b and primary side 320a may be substantially less for the conversion between the voltage measured at voltage high capacitor 318 and the voltage measured at voltage medium capacitor 126, than it would be for the conversion between the voltage measured at voltage high capacitor 318 and the voltage measured at one of the DC ports. In particular, the turns ratio may be less than about four, which may decrease transformer leakage inductance.

In a modification of the above described third embodiment, third bi-directional DC-DC conversion device 300 may be modified to include a zero resonant voltage switching technique circuit. For example, such a zero resonant voltage switching technique circuit may be an inductor and an AC capacitor connected in series with each other and in series with primary side 320a, or, alternatively, with secondary side 320b. The switching of the first and second plurality of switches may be synchronized with each other. Further, an inductance of the inductor and a capacitance of the capacitor may be pre-selected such that a combined resonant frequency of the inductor and capacitor may be about the same as a desired switching frequency of the first and second plurality of switches. Further, the desired switching frequency of the first and second plurality of switches may depend on the desired duty cycle of the first and second plurality of switches. When then the first and second plurality of switches apply a voltage to the inductor and capacitor in the first mode of operation, a current spike may flow through the inductor and capacitor. However, because the switching frequency and the resonant frequency may be about the same, the current may drop back to zero. When the current drops back to zero, the first and second plurality of switches may operate in the second mode of operation, and the current spike may flow through the inductor and capacitor in a direction opposite to its direction in the first mode of operation. This may allow bi-directional power transfer through the use of zero resonant voltage switching technique circuit.

Figure 4:
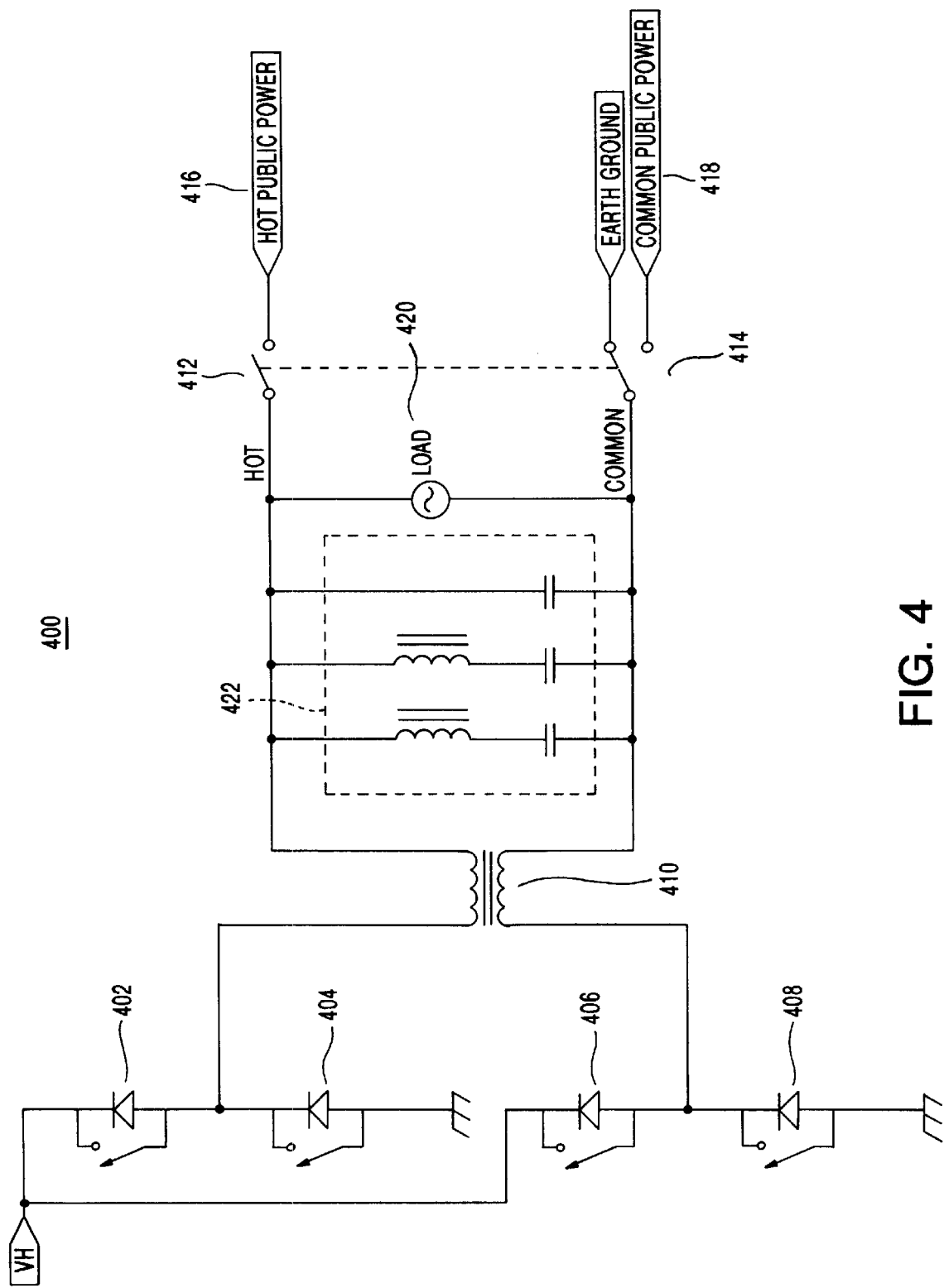
FIG. 4 is a schematic of a bi-directional high voltage DC-AC conversion device, according to still another embodiment of the present invention.

Referring to FIG. 4 a schematic describes a bi-directional DC-AC conversion device according to a fourth embodiment of the present invention. Bi-directional DC-AC conversion device 400 may be connected to third bi-directional DC-DC conversion device 300, or alternatively, may be connected to the modified third bi-directional DC-DC conversion device 300, which may include the zero resonant voltage switching technique circuit. Bi-directional DC-AC conversion device 400 may include a third plurality of switches. The third plurality of switches may be MOSFETS, or alternatively, may be IGBT's. The third plurality of switches may include switches 402, 404, 406, and 408. A drain side of switches 402 and 406 may be connected to voltage high capacitor 318, and a source side of switches 402 and 406 may be connected to inductor 410. Further, a drain side of switches 404 and 408 may be connected to inductor 410. Inductor 410 may be an input or output inductor, and may be connected to a filter 422, and filter 422 may reduce a switching noise produced by the third plurality of switches. Inductor 410 also may be connected to output switches 412 and 414. Further, the third plurality of switches may be closed when a voltage measured at inductor 410 is phase locked and within a predetermined range. The predetermined range may be between negative 180 volts and positive 180 volts. Output switches 412 and 414 further may be connected to AC ports 416, 418, and 420, respectively. In one embodiment, the output switches may be a mechanical relay or a solid state semiconductor switch. Further, AC ports 416, 418, and 420 may be a public grid, an AC generator, or an AC load.

In this embodiment, the third plurality of switches may operate in two modes. In a first mode, switch 408 may remain closed, while switches 402 and 404 may alternately open and close at a high frequency, such that when switch 402 is open, switch 404 may be closed. Alternatively, when switch 402 is closed, switch 404 may be open. The opening and closing of switches 402 and 404 may be at a high frequency, such as about 70 KHz. In a second mode of operation, switch 404 may remain closed, while switches 406 and 408 may alternately open and close at a high frequency, such that when switch 406 is open, switch 408 may be closed. Alternatively, when switch 406 is closed, switch 408 may be open. The opening and closing of switches 406 and 408 again may be at a high frequency, such as about 70 KHz. In addition, the third plurality of switches may form a bi-directional H-bridge between voltage high capacitor 318 and AC ports 416 and 418. The direction of current flow between voltage high capacitor 318 and AC ports 416, 418, and 420 depends on whether the third plurality of switches is operating in the first or second mode of operation. Further, power may be transferred between any combination of AC ports 416, 418, and 420 and power supply ports 122 and 124. The direction of power transfer between AC ports 416, 418, and 420 and power supply ports 122 and 126 depends on whether the third plurality of switches is operating in the first or second mode of operation.

Further, when the third plurality of switches are operating in the first mode of operation, a voltage may be measured at inductor 410 having a waveform shape of a positive half of a sine wave at low frequencies. When the third plurality of switches are operating in the second mode of operation, a voltage may be measured at inductor 410 having a waveform shape of a negative half of the sine wave at low frequencies. In addition, the third plurality of switches may be pulse modulated to determine a shape and amplitude of the output voltage measured at inductor 410.

Figure 7:
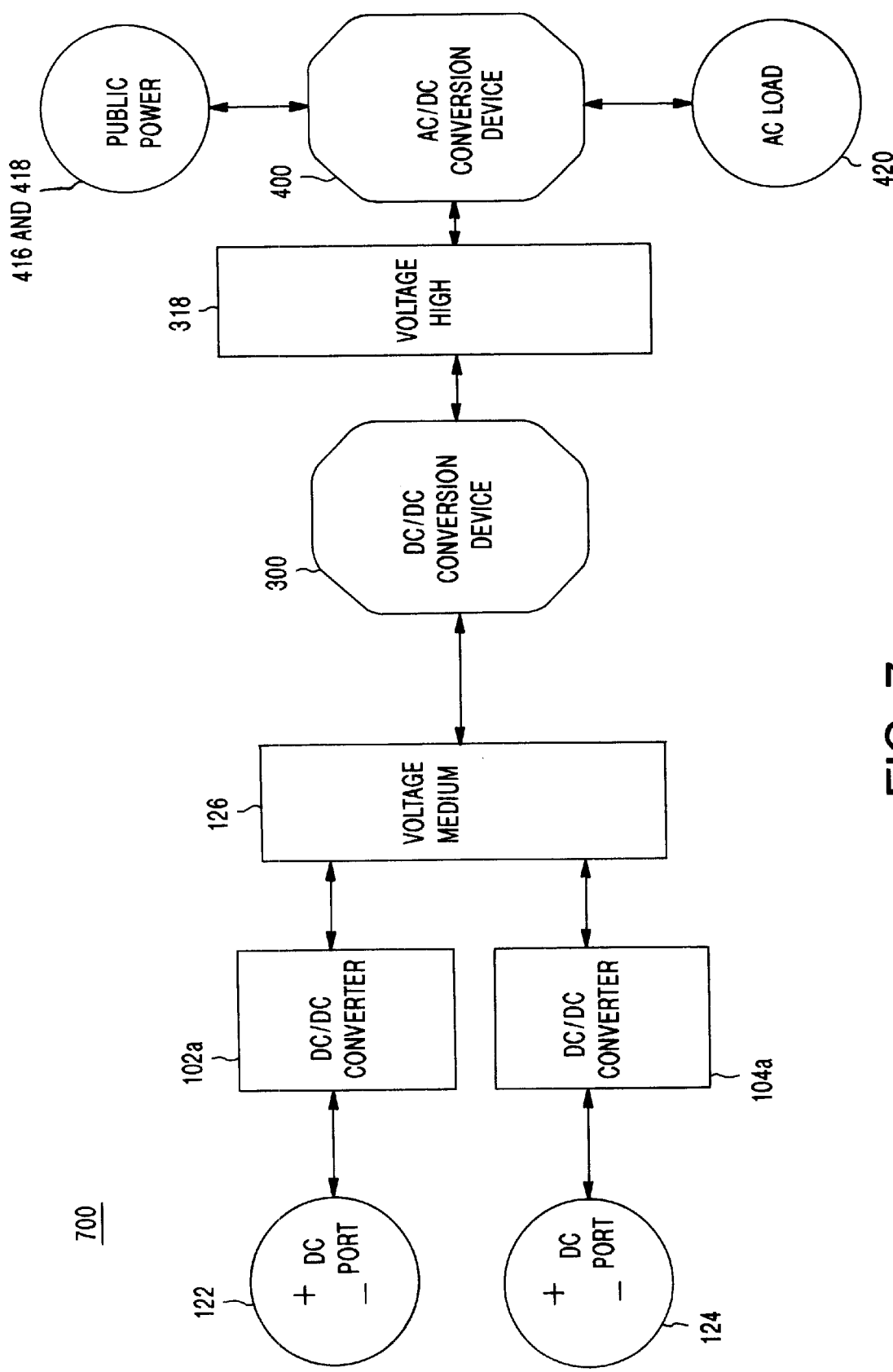
FIG. 7 is a block diagram of a bi-directional power converter, according to still a further embodiment of the present invention.

Referring to FIG. 7, a block diagram of a bi-directional power converter 700 according to an embodiment of the present invention is described. All of the elements which may comprise bi-directional power converter 700 may operate the same as in the above-described embodiments. Bi-directional power converter 700 may comprise DC ports 122 and 124. DC port 122 may be connected to DC/DC converter 102a and DC port 124 may be connected to DC/DC converter 104a, as depicted in FIG. 1. Further, DC/DC converters 102a and 104a may be connected to voltage medium capacitor 126, as depicted in FIG. 1. Voltage medium capacitor 126 may be connected to DC/DC conversion device 300, which further may connected to voltage high capacitor 318, as depicted in FIG. 3. Voltage high capacitor 318 may be connected to AC/DC conversion device 400, which further may be connected to AC ports 416, 418, and 420, as depicted in FIG. 4. In this embodiment, power may be transferred, in either direction, between a combination of DC ports 122 and 124, and AC ports 416, 418, and 420.

Figure 8:
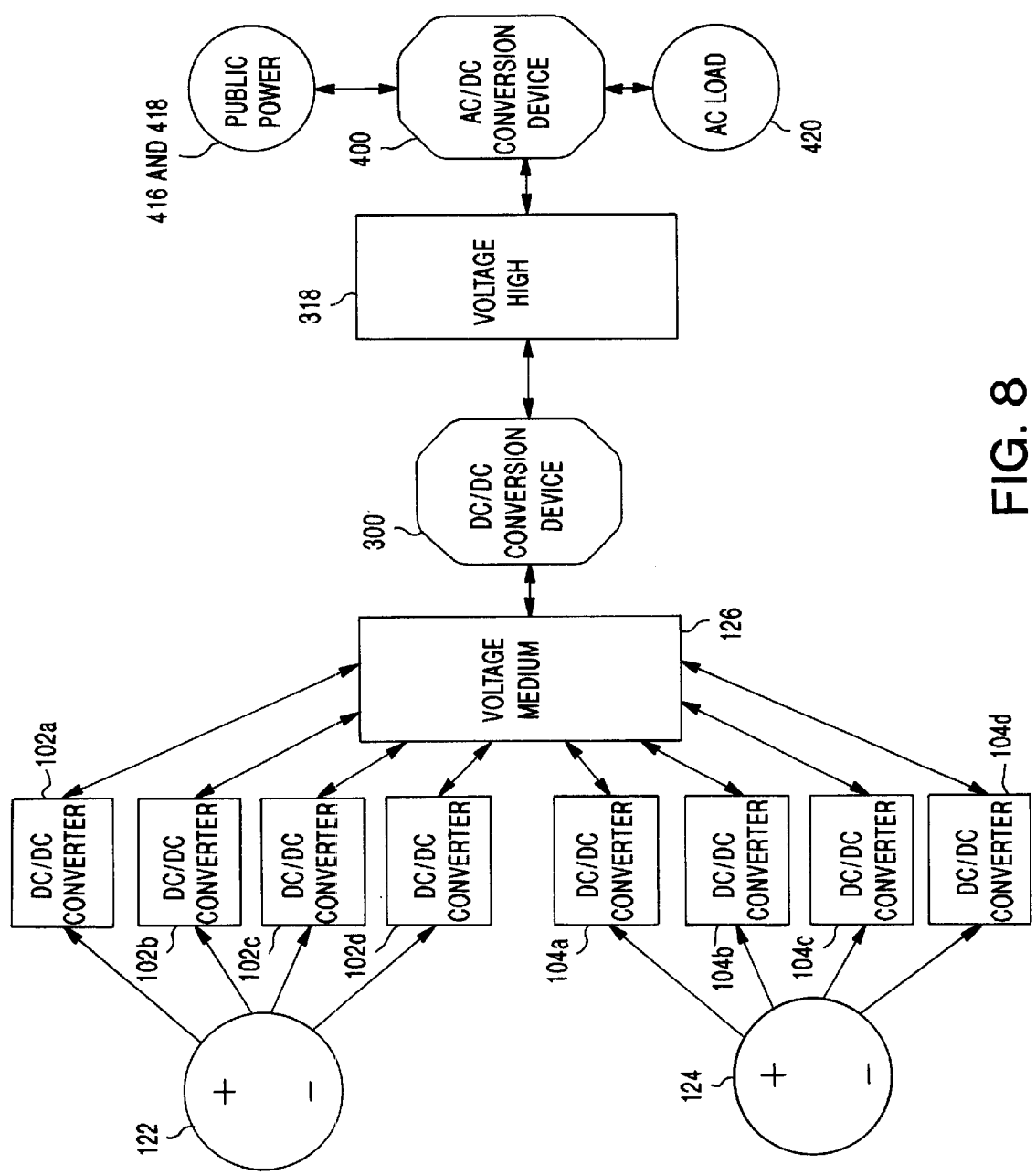
FIG. 8 is a block diagram of a bi-directional power converter, according to yet another embodiment of the present invention.

Referring to FIG. 8, a block diagram of a bi-directional power converter 800 according to another embodiment of the present invention is described. All of the elements which may comprise bi-directional power converter 800 may operate the same as in the above-described embodiments. Bi-directional power converter 800 may comprise DC ports 122 and 124. DC port 122 may be connected to DC/DC converters 102a–d and DC port 124 may be connected to DC/DC converters 104a–d, as depicted in FIG. 2. Further, DC/DC converters 102a–d and 104a–d may be connected to voltage medium capacitor 126, as depicted in FIG. 2. Voltage medium capacitor 126 may be connected to DC/DC conversion device 300, which further may connected to voltage high capacitor 318, as depicted in FIG. 3. Voltage high capacitor 318 may be connected to AC/DC conversion device 400, which further may be connected to AC ports 416, 418, and 420, as depicted in FIG. 4. In this embodiment, power may be transferred, in either direction, between a combination of DC ports 122 and 124, and AC ports 416, 418, and 420.

While the invention has been described in connection with preferred embodiments and examples, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification is considered as exemplary only, with the true scope and spirit of the invention being indicated by the following claims.

What is claimed is:

1. A bi-directional power converter comprising:
   a first bi-directional DC-DC conversion device, wherein in the first bi-directional DC-DC conversion device comprises a first plurality of bi-directional DC-DC converters;
   a plurality of power supply ports each connected to at least one of the first plurality of bi-directional DC-DC converters, wherein the plurality of power supply ports transfer power to each other; and
   a voltage medium capacitor connected to each of the first plurality of bi-directional DC-DC converters, wherein a first voltage measured at the voltage medium capacitor is greater than a second voltage measured at each of the power supply ports.

2. The bi-directional power converter of claim 1, wherein each of the power supply ports is a DC port.

3. The bi-directional power converter of claim 2, wherein each of the DC ports is selected from the group consisting of a battery, a photovoltaic array, a hydrogen fuel cell, a DC load, a DC hydro generator, and a DC wind generator.

4. The bi-directional power converter of claim 2, wherein at least one of the DC ports is a photovoltaic array, and each of the photovoltaic arrays is pulse width modulated and the pulse width modulation maintains the voltage measured at the photovoltaic array at a maximum power point for the array.

5. The bi-directional power converter of claim 3, wherein each of the first plurality of bi-directional DC-DC converters is connected to each of the other bi-directional DC-DC converters via the voltage medium capacitor.

6. The bi-directional power converter of claim 5, wherein each of the first plurality of bi-directional DC-DC converters comprises a first switching device and a second switching device.

7. The bi-directional power converter of claim 6, wherein each of the first and second switching devices comprises a plurality of switches.

8. The bi-directional power converter of claim 6, wherein each of the first and second switching devices has a duty cycle and the duty cycle determines a relative difference between the first voltage measured at the voltage medium capacitor and the second voltages measured at at least one of the DC ports.

9. The bi-directional power converter of claim 8, wherein the first and second switching devices are selected from the group consisting of a MOSFET and an IGBT.

10. The bi-directional power converter of claim 8, wherein each of the first plurality of bi-directional DC-DC converters further comprises:
   at least one inductor connected to at least one of the switching devices and at least one of the DC ports; and at least one capacitor connected to the at least one inductor and at least one of the DC ports.

11. The bi-directional power converter of claim 9, wherein the second voltage measured at at least one of the DC ports is not equal to the second voltages measured at another DC port.

12. The bi-directional power converter of claim 11, wherein at least one first switching device is closed when at least one second switching device is open.

13. The bi-directional power converter of claim 12, wherein the first voltage measured at the voltage medium capacitor is equal to a quotient of each of the second voltages measured at at least one of the DC ports divided by a time ratio, wherein the time ratio is an amount of time that at least one of the first switching devices is closed divided by an operation time of at least one of the first plurality of bi-directional DC-DC converters.

14. The bi-directional power converter of claim 13, wherein the voltage measured at the voltage medium capacitor is a substantially constant value.

15. The bi-directional power converter of claim 14, wherein the substantially constant value is about 50 volts.

16. The bi-directional power converter of claim 14, further comprising:
a third bi-directional DC-DC converter device, wherein the third bi-directional DC-DC conversion device comprises a first plurality of switches, wherein at least one of the first plurality of switches is connected to the voltage medium capacitor and a primary side of a transformer, and a second plurality of switches, wherein at least one of the second plurality of switches is connected to a secondary side of the transformer; and
a voltage high capacitor, wherein the voltage high capacitor is connected to at least one of the second plurality of switches.

17. The bi-directional power converter of claim 16, wherein the primary side and the secondary side are coupled to each other and isolate the voltage high capacitor from the voltage medium capacitor.

18. The bi-directional power converter of claim 17, wherein a ratio of a number of turns on the secondary side to a number of turns on the primary side is equal to a ratio of a third voltage measured at the voltage high capacitor to the first voltage measured at the voltage medium capacitor.

19. The bi-directional power converter of claim 18, wherein the number of turns on the secondary side is less than four times the number of turns on the primary side.

20. The bi-directional power converter of claim 19, wherein the voltage measured at the voltage high capacitor is substantially constant.

21. The bi-directional power converter of claim 20, wherein the substantially constant voltage is about 190 volts.

22. The bi-directional power converter of claim 21, wherein the first plurality of switches forms a bi-directional H-bridge to the primary side and the second plurality of switches forms a bi-directional H-bridge to the secondary side.

23. The bi-directional power converter of claim 22, wherein at least two of the first plurality of switches are concurrently closed when at least two of the second plurality of switches are closed.

24. The bi-directional power converter of claim 23, wherein at least two of the first plurality of switches are concurrently open when at least two of the second plurality of switches are open.

25. The bi-directional power converter of claim 24, wherein the first plurality of switches and the second plurality of switches allow a current to flow from the primary side to the secondary side and from the secondary side to the primary side, and form a bi-directional bridge between the primary side and the secondary side.

26. The bi-directional power converter of claim 25, further comprising:
a plurality of AC ports connected to at least one inductor; and
a bi-directional AC-DC conversion device, wherein the bi-directional AC-DC conversion device comprises a third plurality of switches, wherein at least one of the third plurality of switches is connected to the voltage high capacitor and the at least one inductor.

27. The bi-directional power converter of claim 26, wherein the third plurality of switches form a bi-directional bridge between the voltage high capacitor and the AC ports.

28. The bi-directional power converter of claim 27, wherein at least two of the third plurality switches are concurrently closed and the third plurality of switches determine a shape of a voltage measured at the at least one inductor having a waveform at a low frequency with the shape selected from the group consisting of a positive half of a sine wave and a negative half of the sine wave.

29. The bi-directional power converter of claim 28, wherein the bi-directional AC-DC conversion device further comprises a filter connected to the at least one inductor and the AC ports.

30. The bi-directional power converter of claim 29, wherein the filter reduces a switching noise produced by the third plurality of switches.

31. The bi-directional power converter of claim 30, wherein a pulse modulation of at least one of the third plurality of switches determines the shape and an amplitude of the waveform of the voltage measured at the at least one inductor.

32. The bi-directional power converter of claim 31, wherein the bi-directional AC-DC conversion device further comprises a plurality of output switches connected to the at least one inductor.

33. The bi-directional power converter of claim 32, wherein at least one of the output switches is connected to at least one of the AC ports, and the AC ports transfer power between each of the DC ports.

34. The bi-directional power converter of claim 33, wherein the AC ports are selected from the group consisting of a public power grid, an AC generator, and an AC load.

35. The bi-directional power converter of claim 34, wherein at least one of the output switches is closed when the voltage measured at the at least one inductor is phase locked and within a predetermined range.

36. The bi-directional power converter of claim 35, wherein the plurality of output switches are selected from the group consisting of a mechanical relay and a solid state semiconductor switch.

37. The bi-directional power converter of claim 5, further comprising at least one second bi-directional DC-DC conversion device, wherein each of the second bi-directional DC-DC conversion devices comprises a second plurality of bi-directional DC-DC converters.

38. The bi-directional power converter of claim 37, wherein the first bi-directional DC-DC conversion device and each of the second bi-directional DC-DC conversion devices are connected in parallel.

39. The bi-directional power converter of claim 38, wherein each of the first and second plurality of bi-directional DC-DC converters comprises a first switching device and a second switching device.

40. The bi-directional power converter of claim 39, wherein each of the first and second switching devices comprises a plurality of switches.

41. The bi-directional power converter of claim 39, wherein each of the first switching devices has a first duty cycle and each of the second switching devices has a second duty cycle, wherein the first duty cycles and the second duty cycles determine a relative difference between the first voltage measured at the voltage medium capacitor and the second voltage measured at at least one of the DC ports.

42. The bi-directional power converter of claim 41, wherein at least one of the first duty cycles equals another of the first duty cycles.

43. The bi-directional power converter of claim 42, wherein at least one of the first duty cycles is out of phase with another of the first duty cycles.

44. The bi-directional power converter of claim 43, wherein a phase difference between at least one of the first duty cycles and at least one of the second duty cycles is a quotient of 360 degrees divided by a number of first and second bi-directional DC-DC conversion devices connected in parallel.

45. The bi-directional power converter of claim 44, wherein each of the switching devices is selected from the group consisting of a MOSFET and an IGBT.

46. The bi-directional power converter of claim 44, wherein each of the first plurality of bi-directional DC-DC converters further comprises:
at least one first inductor connected to at least one of the first switching devices and at least one of the DC ports; and
at least one first capacitor connected to the at least one first inductor and at least one of the DC ports;
wherein the second plurality of bi-directional DC-DC converters further comprises:
at least one second inductor connected to at least one of the first switching devices and at least one of the DC ports.

47. The bi-directional power converter of claim 46, wherein the second voltage measured at at least one of the DC ports is not equal to the second voltage measured at another DC port.

48. The bi-directional power converter of claim 47, wherein at least one of the first switching devices is closed when at least one of the second switching devices is open.

49. The bi-directional power converter of claim 48, wherein the first voltage measured at the voltage medium capacitor is equal to a quotient of each of the second voltages measured at at least one of the DC ports divided by a time ratio, wherein the time ratio is an amount of time that at least one of the first switching devices is closed divided by an operation time of at least one of the first plurality of bi-directional DC-DC converters.

50. The bi-directional power converter of claim 49, wherein the first voltage measured at the voltage medium capacitor is a substantially constant value.

51. The bi-directional power converter of claim 50, wherein the substantially constant value is about 50 volts.

52. The bi-directional power converter of claim 50, wherein a current flowing through each of the DC ports is a summation of a current flowing through the at least one first inductor and through the at least one second inductor.

53. The bi-directional power converter of claim 52, wherein the current flowing through each of the DC ports is a substantially constant value.

54. The bi-directional power converter of claim 53, wherein a current flowing into the voltage medium capacitor is greater than zero amps.

55. The bi-directional power converter of claim 53, further comprising:
a third bi-directional DC-DC converter device, wherein the third bi-directional DC-DC conversion device comprises a first plurality of switches, wherein at least one of the first plurality of switches is connected to the voltage medium capacitor and a primary side of a transformer, and a second plurality of switches, wherein at least one of the second plurality of switches is connected to a secondary side of the transformer; and
a voltage high capacitor, wherein the voltage high capacitor is connected to at least one of the second plurality of switches.

56. The bi-directional power converter of claim 55, wherein the primary side and the secondary side are coupled to each other and isolate the voltage high capacitor from the voltage medium capacitor.

57. The bi-directional power converter of claim 56, wherein a ratio of a number of turns on the secondary side to a number of turns on the primary side is equal to a ratio of a third voltage measured at the voltage high capacitor to the first voltage measured at the voltage medium capacitor.

58. The bi-directional power converter of claim 57, wherein the number of turns on the secondary side is less than four times the number of turns on the primary side.

59. The bi-directional power converter of claim 57, wherein the third voltage measured at the voltage high capacitor is substantially constant.

60. The bi-directional power converter of claim 59, wherein the substantially constant voltage is about 190 volts.

61. The bi-directional power converter of claim 59, wherein the first plurality of switches forms a bi-directional H-bridge to the primary side and the second plurality of switches forms a bi-directional H-bridge to the secondary side.

62. The bi-directional power converter of claim 61, wherein at least two of the first plurality of switches are concurrently closed when at least two of the second plurality of switches are closed.

63. The bi-directional power converter of claim 62, wherein at least two of the first plurality of switches are concurrently open when at least two of the second plurality of switches are open.

64. The bi-directional power converter of claim 63, wherein the first plurality of switches and the second plurality of switches allow a current to flow from the primary side to the secondary side and from the secondary side to the primary side and form a bi-directional bridge between the primary side and the secondary side.

65. The bi-directional power converter of claim 64, further comprising:
a plurality of AC ports connected to at least one inductor; and
a bi-directional AC-DC conversion device, wherein the bi-directional AC-DC conversion device comprises a third plurality of switches, wherein at least one of the third plurality of switches is connected to the voltage high capacitor and the at least one inductor.

66. The bi-directional power converter of claim 65, wherein the third plurality of switches form a bi-directional bridge between the voltage high capacitor and the AC ports.

67. The bi-directional power converter of claim 66, wherein at least two of the third plurality switches are concurrently closed and the third plurality of switches determine a voltage measured at the at least one inductor having a waveform at a low frequency with a shape selected from the group consisting of a positive half of a sine wave and a negative half of the sine wave.

68. The bi-directional power converter of claim 67, wherein the bi-directional AC-DC conversion device further comprises a filter connected to the at least one inductor and the AC ports.

69. The bi-directional power converter of claim 68, wherein the filter reduces a switching noise produced by the third plurality of switches.

70. The bi-directional power converter of claim 69, wherein a pulse modulation of at least one of the third plurality of switches determines the shape and an amplitude of the waveform of the voltage measured at the at least one inductor.

71. The bi-directional power converter of claim 70, wherein the bi-directional AC-DC conversion device further comprises a plurality of output switches connected to the at least one inductor.

72. The bi-directional power converter of claim 71, wherein at least one of the output switches is connected to at least one of the AC ports, and the AC ports transfer power between each of the DC ports.

73. The bi-directional power converter of claim 72, wherein the AC ports are selected from the group consisting of a public power grid, an AC generator, and an AC load.

74. The bi-directional power converter of claim 73, wherein at least one of the output switches is closed when the voltage measured at the at least one inductor is phase locked and within a predetermined range.

75. The bi-directional power converter of claim 74, wherein the plurality of output switches are selected from the group consisting of a mechanical relay and a solid state semiconductor switch.

76. The bi-directional power converter of claim 53, further comprising:
a third bi-directional DC-DC converter device, wherein the third bi-directional DC-DC conversion device comprises a first plurality of switches, wherein at least one of the first plurality of switches is connected to the voltage medium capacitor and at least one selected from the group consisting of a primary side of a transformer and a zero resonant switching technique circuit, and a second plurality of switches, wherein at least one of the second plurality of switches is connected to at least one selected from the group comprising a secondary side of the transformer and the zero resonant switching technique circuit; and
a voltage high capacitor, wherein the voltage high capacitor is connected to at least one of the second plurality of switches.

77. The bi-directional power converter of claim 76, wherein the primary side and the secondary side are coupled to each other and isolate the voltage high capacitor from the voltage medium capacitor.

78. The bi-directional power converter of claim 77, wherein a ratio of a number of turns on the secondary side to a number of turns on the primary side is equal to a ratio of a third voltage measured at the voltage high capacitor to the first voltage measured at the voltage medium capacitor.

79. The bi-directional power converter of claim 78, wherein the number of turns on the secondary side is less than four times the number of turns on the primary side.

80. The bi-directional power converter of claim 79, wherein the third voltage measured at the voltage high capacitor is substantially constant.

81. The bi-directional power converter of claim 80, wherein the substantially constant voltage is about 190 volts.

82. The bi-directional power converter of claim 81, wherein the first plurality of switches forms a bi-directional H-bridge to the primary side and the second plurality of switches forms a bi-directional H-bridge to the secondary side.

83. The bi-directional power converter of claim 82, wherein at least two of the first plurality of switches are concurrently closed at when at least two of the second plurality of switches are closed.

84. The bi-directional power converter of claim 83, wherein at least two of the first plurality of switches are concurrently open at when at least two of the second plurality of switches are open.

85. The bi-directional power converter of claim 84, wherein the first plurality of switches and the second plurality of switches allow a current to flow from the primary side to the secondary side and from the secondary side to the primary side, and form a bi-directional bridge between the primary side and the secondary side.

86. The bi-directional power converter of claim 85, further comprising:
a plurality of AC ports connected to at least one inductor; and
a bi-directional AC-DC conversion device, wherein the bi-directional AC-DC conversion device comprises a third plurality of switches, wherein at least one of the third plurality of switches is connected to the zero resonant voltage switching technique circuit and the at least one inductor.

87. The bi-directional power converter of claim 86, wherein the third plurality of switches form a bi-directional bridge between the zero resonant voltage switching technique circuit and the AC ports.

88. The bi-directional power converter of claim 87, wherein at least two of the third plurality switches are concurrently closed and the third plurality of switches determine a voltage measured at the at least one inductor having a waveform at a low frequency with a shape selected from the group consisting of a positive half of a sine wave and a negative half of the sine wave.

89. The bi-directional power converter of claim 88, wherein the bi-directional AC-DC conversion device further comprises a filter connected to the at least one inductor and the AC ports.

90. The bi-directional power converter of claim 89, wherein the filter reduces a switching noise produced by the third plurality of switches.

91. The bi-directional power converter of claim 90, wherein a pulse modulation of at least one of the third plurality of switches determines the shape and an amplitude of the waveform of the voltage measured at the at least one inductor.

92. The bi-directional power converter of claim 91, wherein the bi-directional AC-DC conversion device further comprises a plurality of output switches connected to the at least one inductor.

93. The bi-directional power converter of claim 92, wherein at least one of the output switches is connected to at least one of the AC ports, and the AC ports transfer power between each of the DC ports.

94. The bi-directional power converter of claim 93, wherein the AC ports are selected from the group consisting of a public power grid, an AC generator, and an AC load.

95. The bi-directional power converter of claim 94, wherein at least one of the output switches is closed when the voltage measured at the at least one inductor is phase locked and within a predetermined range.

96. The bi-directional power converter of claim 95, wherein the plurality of output switches are selected from the group consisting of a mechanical relay and a solid state semiconductor switch.

97. The bi-directional power converter of claim 96, further comprising a zero resonant voltage switching technique circuit, wherein the zero resonant voltage switching technique circuit is connected to the voltage medium capacitor.

98. The bi-directional power converter of claim 97, further comprising:
- a plurality of AC ports connected to at least one inductor; and
- a bi-directional AC-DC conversion device, wherein the bi-directional AC-DC conversion device comprises a third plurality of switches, wherein at least one of the third plurality of switches is connected to the zero resonant voltage switching technique circuit and the at least one inductor.

99. The bi-directional power converter of claim 98, wherein the third plurality of switches form a bi-directional bridge between the zero resonant voltage switching technique circuit and the AC ports.

100. The bi-directional power converter of claim 99, wherein at least two of the third plurality switches are concurrently closed and the third plurality of switches create a voltage measured at the at least one inductor having a waveform at a low frequency with a shape selected from the group consisting of a positive half of a sine wave and a negative half of the sine wave.

101. The bi-directional power converter of claim 100, wherein the bi-directional AC-DC conversion device further comprises a filter connected to the at least one inductor and the AC ports.

102. The bi-directional power converter of claim 101, wherein the filter reduces a switching noise produced by the third plurality of switches.

103. The bi-directional power converter of claim 102, wherein a pulse modulation of at least one of the third plurality of switches determines the shape and an amplitude of the waveform of the voltage measured at the at least one inductor.

104. The bi-directional power converter of claim 103, wherein the bi-directional AC-DC conversion device further comprises a plurality of output switches connected to the at least one inductor.

105. The bi-directional power converter of claim 104, wherein at least one of the output switches is connected to at least one of the AC ports, and the AC ports transfer power between each of the DC ports.

106. The bi-directional power converter of claim 105, wherein the AC ports are selected from the group consisting of a public power grid and an AC generator.

107. The bi-directional power converter of claim 106, wherein at least one of the output switches is closed when the voltage measured at the at least one inductor is phase locked and within a predetermined range.

108. The bi-directional power converter of claim 107, wherein the plurality of output switches are selected from the group consisting of a mechanical relay and a solid state semiconductor switch.

109. A bi-directional power converter comprising:
- a first bi-directional DC-DC conversion device, wherein in the first bi-directional DC-DC conversion device comprises a first plurality of bi-directional DC-DC converters;
- a plurality DC ports, wherein each DC port is connected to at least one of the first plurality of bi-directional DC-DC converters, wherein the plurality of DC ports transfer power to each other;
- a voltage medium capacitor connected to each of the first plurality of bi-directional DC-DC converters, wherein a first voltage measured at the voltage medium capacitor is greater than second voltages measured at each of the power supply ports;
- at least one second bi-directional DC-DC conversion device, wherein each of the second bi-directional DC-DC conversion devices comprises a second plurality of bi-directional DC-DC converters, wherein the first bi-directional DC-DC conversion device and each of the second bi-directional DC-DC conversion devices are connected in parallel;
- a third bi-directional DC-DC converter device, wherein the third bi-directional DC-DC conversion device is connected to the voltage medium capacitor;
- a voltage high capacitor, wherein the voltage high capacitor is connected to the third bi-directional DC-DC converter device;
- a bi-directional AC-DC conversion device, wherein the bi-directional AC-DC conversion device is connected to the voltage high capacitor; and
- a plurality of AC ports connected to at least one inductor, wherein the at least one inductor is connected to the bi-directional AC-DC conversion device.

110. The bi-directional power converter of claim 109, wherein the second voltage measured at at least one of the DC ports is not equal to the second voltages measured at another DC port.

\* \* \* \* \*